United States Patent [19]

de Grave et al.

[11] Patent Number: 5,208,265
[45] Date of Patent: May 4, 1993

[54] FOAM BASED ON AN IMPACT COPOLYMER

[75] Inventors: Isidoor de Grave, Wachenheim; Joachim Fischer, Dirmstein; Onno Graalmann, Dossenheim, all of Fed. Rep. of Germany

[73] Assignee: BASF Aktiengesellschaft, Ludwigshafen, Fed. Rep. of Germany

[21] Appl. No.: 924,492

[22] Filed: Aug. 4, 1992

[30] Foreign Application Priority Data

Aug. 9, 1991 [DE] Fed. Rep. of Germany ....... 4126358

[51] Int. Cl.$^5$ .............................. C08J 9/18; C08J 9/20; C08J 9/232
[52] U.S. Cl. ........................................ 521/59; 521/98; 521/134; 525/88
[58] Field of Search ................. 521/134, 98, 59; 525/88

[56] References Cited

U.S. PATENT DOCUMENTS 4,626,555 12/1986 Endo et al. ...................... 521/59

FOREIGN PATENT DOCUMENTS 91101110 8/1991 European Pat. Off. .

*Primary Examiner*—Morton Foelak
*Attorney, Agent, or Firm*—Keil & Weinkauf

[57] ABSTRACT

In foams having a density of from 0.01 to 0.2 g/cm$^3$ and a cell count of from 2 to 1,000 cells/mm$^2$ and based on an impact copolymer, the impact copolymer consists of
a) from 1 to 55% by weight of a block copolymer of
  a$_1$) from 35 to 65% by weight of ethylene and
  a$_2$) from 35 to 65% by weight of propylene and
b) from 45 to 99% by weight of a random copolymer of
  b$_1$) from 0.5 to 6% by weight of ethylene and from 94 to 99.5% by weight of propylene, or of
  b$_2$) from 0.5 to 12% by weight of but-1-ene and 88 to 99.5% by weight of propylene.

7 Claims, No Drawings

FOAM BASED ON AN IMPACT COPOLYMER

The present invention relates to novel foams based on an impact copolymer, in particular foams which consist of a rubber phase of a propylene/ethylene block copolymer and a thermoplastic phase of a random copolymer of propylene and ethylene or propylene and but-1-ene.

Because of their heat stability and good shock-absorbing properties, foams based on polyolefins and olefin copolymers are of considerable industrial interest. They are produced in a known manner by impregnating the polymer with a volatile blowing agent at elevated temperatures under superatmospheric pressure and letting down the mixture. Either the extrusion method or, advantageously, the suspension impregnation method is used. The latter starts from polymer particles which are impregnated in aqueous suspension with the blowing agent and are then expanded to give foam particles. Moldings of any shape can be produced by welding the foam particles.

However, the conventional foams based on olefin (co)polymers have a number of disadvantages. They have either high tensile strength, compressive strength and flexural strength in conjunction with unsatisfactory elongation at break or high elongation at break in conjunction with unsatisfactory tensile strength, compressive strength and flexural strength.

Furthermore, owing to great shear stresses during the extrusion process, degradation processes occur in the preparation of the granules used. This is particularly disadvantageous for the recycling of the foams, in which melting must be carried out again each time.

DE-A 35 39 352 (U.S. Pat. No. 4 626 555) discloses essentially polypropylene resin foam particles having a bulk density of from 8 to 100 g/l and a particle diameter of from 1 to 5 mm, the polypropylene resin comprising from 5 to 30% by weight of a substance soluble in xylene at room temperature and having an ethylene content of from 20 to 80% by weight and from 70 to 95% by weight of a substance insoluble in xylene at room temperature and having a main melting point peak at from 130 to 158° C.

The polypropylene resin may be a blend of an ethylene/propylene random copolymer with an ethylene/propylene rubber.

It is an object of the present invention to provide foams which, in conjunction with improved recyclability, have both high tensile strength, flexural strength and compressive strength and high elongation at break. The foams should moreover have high abrasion resistance and good low temperature impact strength.

We have found that this object is achieved and, surprisingly, that foams based on certain impact copolymers which consist of a rubber phase of a propylene-/ethylene block copolymer and a thermoplastic phase of a random copolymer of propylene and ethylene or propylene and but-1-ene possess all the desired properties.

The present invention thus relates to foams having a density of from 0.01 to 0.2 g/cm$^3$ and a cell count of from 2 to 1,000 cells/mm$^2$ and based on an impact copolymer consisting of a) from 1 to 55% by weight of a block copolymer of
 a$_1$) from 35 to 65% by weight of ethylene and
 a$_2$) from 35 to 65% by weight of propylene and
b) from 45 to 99% by weight of a random copolymer of
 b$_1$) from 0.5 to 6% by weight of ethylene and from 94 to 99.5% by weight of propylene, or of
 b$_2$) from 0.5 to 12% by weight of but-1-ene and 88 to 99.5% by weight of propylene.

The basic components of the novel foams are impact copolymers of from 1 to 55, preferably from 1 to 50, in particular from 2 to 50, % by weight of a block copolymer a) of from 35 to 65% by weight of ethylene and from 35 to 65% by weight of propylene, and from 45 to 99, preferably from 50 to 99, in particular from 50 to 98, % by weight of a random copolymer b) of from 0.5 to 6, preferably from 1 to 6, in particular from 1 to 4, % by weight of ethylene and from 94 to 99.5, preferably from 94 to 99, in particular from 96 to 99, % by weight of propylene, or of from 0.5 to 12, preferably from 1 to 12, in particular from 1 to 10, % by weight of but-1-ene and from 88 to 99.5, preferably from 88 to 99, in particular from 90 to weight of propylene. The impact copolymers have a modulus of elasticity of from 50 to 1,500, preferably from 100 to 1,400, in particular from 100 to 1,350, N/mm$^2$.

The block copolymer a) and the random copolymer b) are prepared in a known manner by copolymerization of the monomers by means of transition metal catalysts.

The impact copolymer can be prepared therefrom by mixing block copolymer a) and random copolymer b) in the melt in an extruder (referred to as extruder blends).

The preparation of the impact copolymers is preferably carried out in a cascade of two reactors (referred to as reactor blends). The random copolymer b) is first prepared in the first reactor by copolymerization of the monomers by means of transition metal catalysts, and the block copolymer a) is prepared in the second reactor in a corresponding manner.

Particularly preferred impact copolymers are obtained by two-stage polymerization from the gas phase in an agitated fixed bed by means of a Ziegler-Natta catalyst system which contains an aluminum compound in addition to a titanium-containing solid component, according to European Patent Application No. 91 101 110.4.

Because of the good phase dispersion (i.e. the good mixing of block copolymer a) and random copolymer b) in the second reactor), the impact copolymers can then be extruded under mild conditions. The negative effect of strong shear stresses during the extrusion process is thus decreased. The reduced thermal damage to the polymer matrix in the extruder furthermore has a positive effect on the recyclability of the products.

The impact copolymers are in general linear and uncrosslinked. The crystallite melting point, determined according to the DSC method, is in general from 125 to 165° C., in particular from 135° to 165° C. The heat of fusion, determined according to the DSC method, is in general from 30 to 110, preferably from 40 to 100, J/g. Impact copolymers having a melt flow index MFI (230; 2.16; according to DIN 53,735) of from 0.1 to 15, in particular from 0.5 to 12, g/10 min are preferably used.

The molecular weight (M$_W$) of the impact copolymers must not be too low, in order to avoid increased agglomeration during the impregnation. On the other hand, molecular weights which are too high have an adverse effect on the preparation of the granules and the processing properties of the foam particles.

The block copolymers a) generally have weight average molecular weights $M_W$ of from 50,000 to 500,000, preferably from 100,000 to 500,000, particularly preferably from 150,000 to 450,000.

The random copolymers b) generally have weight average molecular weights $M_W$ of from 100,000 to 600,000, preferably from 150,000 to 500,000, particularly preferably from 200,000 to 500,000.

Block copolymers a) and random copolymers b) present in the novel impact copolymers have very different solubilities in xylene.

The block copolymer a) has a solubility of from 70 to 98, preferably from 80 to 98, particularly preferably from 90 to 98, % by weight in xylene at 25

The random copolymer b) has a solubility of less than 10, preferably less than 5, % by weight in xylene at 25° C.

The foam may furthermore contain conventional additives in effective amounts, such as dyes, pigments, nucleating agents, stabilizers, flameproofing agents, synergistic agents, lubricants and antistatic agents.

The novel foams have a density of from 0.01 to 0.2, preferably from 0.01 to 0.18, in particular from 0.02 to 0.1, $g/cm^3$. They are predominantly closed-cell foams having a cell count of from 2 to 1,000, preferably from 5 to 800, in particular from 10 to 500, $cells/mm^2$.

The novel foams are prepared in a conventional manner by mixing the copolymer with a volatile blowing agent and, if required, the additives and then carrying out expansion. For example, the components are mixed in an extruder and the blend is then extruded through a die, during which it expands. Films, extrudates and sheets can be produced continuously in this manner.

Suitable blowing agents are low boiling halohydrocarbons, inorganic gases and, preferably, aliphatic hydrocarbons of 3 to 5 carbon atoms, such as propane, n-butane, isobutane, n-pentane, isopentane and/or neopentane. Mixtures of the stated blowing agents may also be used.

The novel foams are preferably prepared in a conventional manner by the suspension impregnation process. For this purpose, the copolymer, advantageously in the form of particles having a mean diameter of from 0.5 to 5 mm, preferably from 0.6 to 4 mm, is impregnated in aqueous suspension with from 0.1 to 0.4, preferably from 0.15 to 0.3, kg of a blowing agent per kg of copolymer at about 5°–20° C. below the crystallite melting point (DSC maximum) of the polymer and under superatmospheric pressure and is then let down with expansion.

The resulting foam particles generally have a mean diameter of from 1 to 20 mm and a bulk density of about 5–100, preferably 10–90, g/l.

Particularly in the case of low bulk densities, the blowing agent frequently diffuses out of the cells more rapidly than the surrounding air diffuses in. In some cases, the particles may therefore shrink to 40% of their original volume. They assume their original shape again when they are treated with air or nitrogen under superatmospheric pressure of from 0.5 to 10 bar for a sufficient time, in general from 5 to 500 minutes, at room temperature or at an elevated temperature of not more than 20° C. below the crystallite melting point of the impact copolymer. The foam particles can be welded by known methods, by heating in porous or non-gastight molds, to give any shape of moldings.

The novel foams generally have a tensile strength of from 0.1 to $4.0 N/mm^2$, a limiting flexural stress of from 0.05 to $4.5 N/mm^2$, a compressive stress of from 0.10 to $4.0 N/mm^2$ at 50% compression and an elongation at break of from 2 to 60%.

The novel foams moreover have high abrasion resistance and good low temperature impact strength.

EXAMPLES

In the Examples which follow, parts are by weight.

The tensile strength and the elongation at break were determined according to DIN 53,571 (method II, test specimen B), the compressive stress at 50% compression according to DIN 53,577, the limiting flexural stress according to DIN 53,423 and the modulus of elasticity according to DIN 53,457. The crystallite melting point was determined by heating 10 mg of the test specimen at a heating rate of 20° C./min to 200° C., cooling the test specimen at a cooling rate of 20° C./min to room temperature and reheating at a heating rate of 20° C./min to above the melting range. The crystallite melting point was determined as the tip of the temperature peak in the DSC diagram of the second heating period.

EXAMPLE 1

In a pressure vessel, 100 parts of an impact copolymer prepared according to European Patent Application No. 91 101 110.4 and consisting of 86% by weight of a random ethylene/propylene copolymer having an ethylene content of 2.3% by weight and 14% by weight of an ethylene/propylene block copolymer having an ethylene content of 50% by weight (melt flow index 230; 2.16=3.2 g/10 min; DSC maximum 148° C., modulus of elasticity 720 $N/mm^2$), 24 parts of 60:40 n-butane/isobutane, 228 parts of water, 6.8 parts of tricalcium phosphate and 0.14 part of sodium dodecylbenzenesulfonate as a dispersant were heated to 130.5° C. in the course of 64 minutes while stirring and then, while the pressure in the kettle was kept constant at 30 bar by forcing in further nitrogen, discharged through a base valve and let down. Foam particles having a bulk density of 18.5 g/l were obtained.

The particles were dried and then introduced pneumatically into a preheated mold cavity, and the mold was heated for 12 seconds with steam at 135° C. The pressure in the mold was then let down, the mold was cooled with water and opened and the molding was removed. The molding had a density of 35 g/l excellent welding properties, a tensile strength of $0.44 N/mm^2$, a limiting . flexural stress of $0.41 N/mm^2$, a compressive stress (50% compression) of $0.24 N/mm^2$ and an elongation at break of 24%.

EXAMPLES 2 TO 6

The procedure was as described in Example 1, except that impact copolymers having the composition shown in the Table and different amounts of blowing agents and dispersants and different impregnating temperatures and impregnating times were used. The results are summarized in the Table.

COMPARATIVE EXAMPLES 7 TO 10

The procedure was as described in Examples 1 to 6, except for the exclusive use of random copolymers having the composition shown in the Table and under the conditions stated in the Table. The results are summarized in the Table.

TABLE

| Example | Random copolymer C2 [% by wt.] | Random copolymer C3 [% by wt.] | Random copolymer C4 [% by wt.] | Block copolymer C2/C3 | Block copolymer Proportion by wt. [% by wt.] | DSC max. [°C] | MFI (230; 2.16) [g/10 min] | Modulus of elasticity [N/mm²] | Test conditions during impregnation n-Butane/ isobutane [Parts] | Tricalcium phosphate [Parts] | Na dodecyl- benzenesulfonate [Parts] |
|---|---|---|---|---|---|---|---|---|---|---|---|
| 1 | 2.3 | 97.7 | — | 50/50 | 14 | 148 | 3.2 | 720 | 24 | 6.8 | 0.14 |
| 2 | 2.3 | 97.7 | — | 50/50 | 33 | 146 | 1.6 | 320 | 24 | 6.8 | 0.14 |
| 3 | 2.3 | 97.7 | — | 50/50 | 19 | 148 | 2.6 | 600 | 20 | 3.4 | 0.02 |
| 4 | 3.3 | 96.7 | — | 50/50 | 18 | 140 | 2.8 | 400 | 24 | 6.8 | 0.14 |
| 5 | — | 89.6 | 10.4 | 50/50 | 13 | 145 | 2.8 | 650 | 24 | 6.8 | 0.14 |
| 6 | — | 94.7 | 5.3 | 50/50 | 13 | 151 | 3.0 | 910 | 20 | 3.4 | 0.02 |
| 7 (Comp.) | 2.3 | 97.7 | — | — | — | 151 | 8 | 1050 | 24 | 6.8 | 0.14 |
| 8 (Comp.) | 2.3 | 97.7 | — | — | — | 151 | 8 | 1050 | 20 | 3.4 | 0.02 |
| 9 (Comp.) | 4.1 | 94.5 | 1.4 | — | — | 133 | 5 | 520 | 24 | 6.8 | 0.14 |
| 10 (Comp.) | 4.1 | 94.5 | 1.4 | — | — | 133 | 5 | 520 | 20 | 3.4 | 0.02 |

| Example | Impregnation temperature [°C] | Impregnation time [min] | Bulk density [g/l] | Molding density [g/l] | Tensile strength [N/mm²] | Compressive stress (50% compression) [N/mm²] | Limiting flexural stress [N/mm²] | Elongation at break [%] |
|---|---|---|---|---|---|---|---|---|
| 1 | 130.5 | 64 | 18.5 | 35 | 0.44 | 0.24 | 0.41 | 24 |
| 2 | 131.0 | 64 | 17 | 30 | 0.26 | 0.14 | 0.14 | 42 |
| 3 | 132.0 | 64 | 32 | 60 | 0.73 | 0.43 | 0.65 | 22 |
| 4 | 123.5 | 62 | 18 | 30 | 0.34 | 0.16 | 0.17 | 36 |
| 5 | 130.5 | 64 | 17.5 | 30 | 0.38 | 0.20 | 0.23 | 22 |
| 6 | 136.2 | 65 | 31.4 | 60 | 0.82 | 0.57 | 0.74 | 18 |
| 7 (Comp.) | 135.8 | 65 | 16 | 22 | 0.27 | 0.17 | 0.23 | 14 |
| 8 (Comp.) | 135.8 | 65 | 33 | 55 | 0.75 | 0.50 | 0.83 | 11 |
| 9 (Comp.) | 118.0 | 60 | 15 | 20 | 0.22 | 0.14 | 0.15 | 30 |
| 10 (Comp.) | 117.5 | 60 | 33 | 60 | 0.73 | 0.40 | 0.68 | 20 |

We claim:

1. A foam having a density of from 0.01 to 0.2 g/cm³ and a cell count of from 2 to 1,000 cells/mm² and based on an impact copolymer, wherein the impact copolymer consists of
   a) from 1 to 55% by weight of a block copolymer of
      a₁) from 35 to 65% by weight of ethylene and
      a₂) from 35 to 65% by weight of propylene and
   b) from 45 to 99% by weight of a random copolymer of
      b₁) from 0.5 to 6% by weight of ethylene and from 94 to 99.5% by weight of propylene, or of
      b₂) from 0.5 to 12% by weight of but-1-ene and 88 to 99.5% by weight of propylene.

2. A foam as claimed in claim 1, wherein the random copolymer b) consists of
   b₁) from 0.5 to 6% by weight of ethylene and from 94 to 99.5% by weight of propylene.

3. A foam as claimed in claim 1, wherein the random copolymer b) consists of
   b₂) from 0.5 to 12% by weight of but-1-ene and from 88 to 99.5% by weight of propylene.

4. A foam as claimed in claim 1, wherein the impact copolymer was prepared by two-stage polymerization from the gas phase in an agitated fixed bed by means of a Ziegler-Natta catalyst system which contains an aluminum compound in addition to a titanium-containing solid component.

5. A foam as claimed in claim 1, wherein the block copolymer a) has a weight average molecular weight of from 50,000 to 500,000 and the random copolymer b) has a weight average molecular weight of from 100,000 to 600,000.

6. A foam as claimed in claim 1, wherein the block copolymer a) and the random copolymer b) are linear.

7. A process for the preparation of a foam having a density of from 0.01 to 0.2 g/cm² and a cell count of from 2 to 1,000 cells/mm² and based on an impact copolymer, wherein the impact copolymer is prepared from
   a) from 1 to 55% by weight of a block copolymer of
      a₁) from 35 to 65% by weight of ethylene and
      a₂) from 35 to 65% by weight of propylene and
   b) from 45 to 99% by weight of a random copolymer of
      b₁) from 0.5 to 6% by weight of ethylene and from 94 to 99.5% by weight of propylene, or of
      b₂) from 0.5 to 12% by weight of but-1-ene and 88 to 99.5% by weight of propylene by two-stage polymerization from the gas phase in an agitated fixed bed by means of a Ziegler-Natta catalyst system which contains an aluminum compound in addition to a titanium-containing solid component.

* * * * *